United States Patent
van der Huizen et al.

(10) Patent No.: US 6,887,956 B2
(45) Date of Patent: May 3, 2005

(54) CATALYST SYSTEM FOR HIGH-CIS POLYBUTADIENE

(75) Inventors: Adriaan A. van der Huizen, Castricum (NL); Jean-Marc Potlet, Velaux (FR); Alain Sabatier, Lacon de Provence (FR); Patrick Le Roy, Salon de Provence (FR)

(73) Assignee: Dow Global Technologies Inc., Midland, MI (US)

( * ) Notice: Subject to any disclaimer, the term of this patent is extended or adjusted under 35 U.S.C. 154(b) by 72 days.

(21) Appl. No.: 10/398,875

(22) PCT Filed: Oct. 2, 2001

(86) PCT No.: PCT/US01/30855

§ 371 (c)(1),
(2), (4) Date: Apr. 11, 2003

(87) PCT Pub. No.: WO02/30997

PCT Pub. Date: Apr. 18, 2002

(65) Prior Publication Data

US 2004/0029722 A1 Feb. 12, 2004

Related U.S. Application Data

(60) Provisional application No. 60/239,837, filed on Oct. 12, 2000.

(51) Int. Cl.$^7$ .............................. B01J 31/00; C08F 4/80
(52) U.S. Cl. .............................. 526/90; 526/92; 526/93; 526/144; 526/335; 526/171; 526/138; 526/153; 526/340.4; 502/152; 502/103; 502/150; 502/117; 502/153; 502/118; 502/154; 502/129; 502/132

(58) Field of Search .............................. 526/144, 92, 335, 526/93, 171, 138, 153, 340.4, 90; 502/152, 103, 150, 117, 153, 118, 154, 129, 132

(56) References Cited

U.S. PATENT DOCUMENTS

| 3,135,725 A | 6/1964 | Carlson et al. |
| 3,336,280 A | 8/1967 | Naylor |
| 5,280,081 A | * 1/1994 | Abraham ............. 525/339 |
| 5,733,835 A | 3/1998 | Castner ............. 502/125 |
| 5,905,125 A | 5/1999 | Tsujimoto et al. ...... 526/144 |

FOREIGN PATENT DOCUMENTS

| EP | 0 652 239 | 9/1997 |
| EP | 0 823 441 | 2/1998 |
| EP | 0 770 631 | 6/2000 |
| JP | 11-080222 | 3/1999 |
| WO | WO 00/14130 | 3/2000 |
| WO | WO 00/46267 | 8/2000 |

* cited by examiner

Primary Examiner—Elizabeth D. Wood

(57) ABSTRACT

A catalyst system suitable for use in the production of high cis polybutadiene is disclosed. The catalyst system includes a cobalt salt of the formula $CoA_x$, where A is a monovalent or divalent anion and x is 1 or 2; an alkyl aluminum chloride compound of the structure $R_2AlCl$, where R is an alkyl group containing 2–8 carbon atoms; a trialkyl aluminum compound of the formula $R_3Al$, where R is an alkyl group containing 2–8 carbon atoms; and a catalytic amount of water.

15 Claims, No Drawings

CATALYST SYSTEM FOR HIGH-CIS POLYBUTADIENE

This application claims the benefit of provisional application of 60/239,837 filed on Oct. 12, 2000.

FIELD OF THE INVENTION

The present invention relates to an improved catalyst system for use in the polymerization of conjugated diolefins. More particularly the present invention relates to the selection of particular Cobalt salts together with particular alkylaluminum chloride compounds together with water for use as a catalyst, particularly suited for the production of high-cis poly(butadiene).

BACKGROUND AND SUMMARY OF THE INVENTION

Many catalyst systems and production processes are known for the production of high cis (that is, greater than about 90%, more preferably greater than 95% in the cis formation) polybutadienes. These processes typically involve the polymerization of 1,3-butadiene in an inert liquid polymerization medium in the presence of a homogeneous catalyst system. The catalyst system typically comprises a transition metal (principally cobalt) salt with an alkyl aluminum halide.

For example, U.S. Pat. No. 3,135,725 teaches a high cis polybutadiene can be produced by polymerizing 1,3-polybutadiene in an inert solvent in the presence of a catalyst which contains cobalt in complex combination with an alkyl aluminum chloride.

Recently, European Patent 0,652,239 B1 disclosed a process for producing high-cis polybutadiene comprising polymerizing 1,3-butadiene in an inert hydrocarbon solvent together with water and a catalyst system comprising (in specified ratios) (1) a substantially anhydrous divalent cobalt salt $CoA_m$, where A is a monovalent or divalent anion of the salt and m is 0 or 1; (2) diethyl aluminum chloride or ethyl aluminum sesquichloride and (3) an organo aluminum compound of the formula $R_3Al$, wherein R is an alkyl group having from 8–12 carbon atoms (and optionally triethyl aluminum). The addition of the trialkyl aluminum compounds was said to reduce the level of gel formation in the reaction product.

Currently, cobalt dioctoate is the most commonly used source of cobalt in the industry. This is also the preferred Cobalt salt in EP 0,652,239. Similarly, the most commonly used, and EP 0,652,239's preferred organo aluminum chloride species is diethyl aluminum chloride ("DEAC"). This is probably due in part to cobalt dioctoate's relatively high solubility in DEAC. It has been observed, however, that DEAC promotes branching in the polybutadiene which leads to the formation of gels, causing fouling on the reactor surfaces. Increased fouling requires the reactors to be shut down for maintenance more frequently.

Accordingly, it is an objective of the present invention to provide a catalyst system which reduces branching and fouling without a substantial decrease in the catalyst activity.

It has been discovered that the use of ethyl aluminum sesquichloride together with trioctyl aluminum produces a more linear product and exhibits less fouling that when DEAC alone is used. This effect is somewhat offset by slower conversion rates which were observed. These conversion rates were improved however, by using cobalt neodecanoate as the cobalt salt. Furthermore it was observed that the activity of all of these cobalt systems could be improved by the addition of an amount of ternary alkyl or aryl amines. Thus it was possible to achieve similar conversion rates, while simultaneously reducing branching and reducing fouling of the reactor.

Accordingly, one aspect of the invention is the use of ethylaluminum sesquichloride and trioctylaluminum as co-catalyst with a cobalt salt. Another aspect of the present invention is the use of cobalt neodecanoate as the cobalt salt. Yet another aspect of the present invention relates to the use of ternary alkyl amines or ternary aryl amines as an additive to a catalyst system which comprises a cobalt salt together with an organo aluminum halide.

Other references worth considering including U.S. Pat. No. 5,905,125 which discloses a catalyst system comprising a cobalt salt, trialkyl aluminium, aluminium halide and water; U.S. Pat. No. 5,733,835 which discloses a catalyst system comprising an organo- cobalt compound, trialkyl aluminium and hexafluoro-2-propanol, and U.S. Pat. No. 3,336,280 which discloses a catalyst system comprising molybdenum pentachloride, organo-aluminium and the use of amines as "promoters".

DETAILED DESCRIPTION OF THE INVENTION

The present invention broadly relates to a catalyst system suitable for use in the production of high cis polybutadiene. The catalyst system comprises a cobalt salt of the formula $CoA_x$, wherein A is a monovalent or divalent anion and x is 1 or 2; and an alkyl aluminum chloride compound of structure $R_2AlCl$ where R is an alkyl group containing 2–8 carbon atoms; and water. The catalyst system may optionally further comprise a ternary alkyl amine or a ternary aryl amine and/or a trialkyl aluminum compound of the formula $R_3Al$ where R is as defined above.

The cobalt salt of the present invention can be any of those generally known in the art. Examples include cobalt (II) acetylacetonate, cobalt (II) octoate, cobalt (II) isooctoate, cobalt (II) naphthanate, Cobalt (II) neodecanoate and their cobalt (III) congeners. In general it is preferred that the cobalt salt be anhydrous. Of these, cobalt (II) neodecanoate was observed to give the most activity when using the preferred ethylaluminum sesquichloride/trioctyl aluminum co-catalyst.

The catalyst system of the present invention also includes an alkyl aluminum chloride compound of structure $R_2AlCl$ where R is an alkyl group containing 2–8 carbon atoms. The R group may be straight or branched. Suitable compounds include diethylaluminum chloride, di-n-butylaluminimum chloride, di-n-octylaluminum chloride, ethyl-n-octylaluminum chloride, ethyl aluminum dichloride, and ethylaluminum sesquichloride. It is preferred that a trialkyl aluminum compound of formula $R_3Al$, where R is as defined above, also be part of the catalyst system. Suitable trialkyl aluminum compounds include triethylaluminum, and trioctyl aluminum. It should be understood that the trialkylaluminum can first reacted with the alkylaluminum chloride compound to form an intermediate species before combining with the catalyst system. For example, an equimolar mixture of ethyl aluminum sesquichloride together with trioctyl aluminum (which mixture may hereafter be referred to as "EOAC") was shown to give particularly good results in terms of maintaining activity while reducing fouling and branching, when added to the catalyst system.

The catalyst system also contains a catalytic amount of water. The amount of water should typically be in the range of 0.1 to 0.8 moles per mole of the alkyl aluminum chloride compound used, with about 0.5 being most preferred. The exclusion of additional moisture can be achieved by maintaining a nitrogen or other inert atmosphere over the liquid when preparing the reaction mixture and carrying out the polymerization.

It has been discovered that the presence of a ternary amine can also boost the performance of the catalyst system. The catalyst system can therefore optionally contain a ternary alkyl/aryl amine. The alkyl groups which may be used in this aspect of the invention may be linear or have branching. Aryl groups can similarly be chosen from all existing materials. It is generally preferred, that the amine be somewhat water soluble, however, as this allows it to be more easily removed in water washes. Thus shorter chain lengths, such as $C_6$ or less, are generally preferred. It should be understood that the same amine may have alkyl and aryl characteristics. Suitable examples include triethylamine, tributylamine, triphenylamine, dimethylphenylamine, and triethanolamine, with triethylamine and triethanolamine being generally more preferred. The amine should be added in an amount such that the molar ratio of cobalt to nitrogen is in the range of 1:0.1 to 1:10, more preferably in the range of 1:1 to 1:3.

As is generally known in the art, the catalyst system of the present invention will be added to a mixture comprising 1,3-butadiene in one or more hydrocarbon materials which act as a solvent at least for the monomer. The solvent can also be useful to control the polymerization temperature by refluxing. In this regard, it should be appreciated that by mixing two or more solvents the desired polymerization temperature can be more precisely achieved. Preferred solvents include aliphatic, cycloaliphatic, aromatic, and monoolefinic hydrocarbons and mixtures thereof. Particularly well suited solvents for use with the catalyst system of the present invention include $C_4$–$C_8$ aliphatic hydrocarbons, $C_5$ to $C_{10}$ cyclic aliphatic hydrocarbons, $C_6$ to $C_9$ aromatic hydrocarbons, and $C_4$ to $C_6$ monoolefinic hydrocarbons or mixtures thereof. 2-butene, 1-butene, cyclohexane, benzene, pentane, hexane, heptane, toluene, and xylene are specific examples of such suitable solvents.

The catalyst should be made up of the various components in ratios such that when added to the solvent and monomer, the cobalt is present in the reaction medium in a ratio of cobalt to Al from approximately 1:75 to 1:150, with a range of 1:90 to 1:125 being more preferred. Typical cobalt concentrations in the reaction medium are about 2 ppm, although they can range from 0.2 to 10 ppm. The alkyl aluminum chloride/trialkyl aluminum compounds are added such that the total amount of Al in the reaction system is in the range of 0.002–0.004 molar. It is preferred that the concentration of Al in the final reaction mixture be approximately 0.003 molar. It is preferred that from 10 to 90, more preferably 50 to 75 percent of the total Al come from the alkyl aluminum chloride species.

In conducting the polymerization using this catalyst, many procedures may be filed. This catalyst system appears to be particularly effective in polymerizing 1,3-butadiene in a feed comprising about 5 to 30 percent, more preferably 15 to 25, most preferably about 20 percent by weight 1,3-butadiene, 30 to 70, more preferably 45 to 65 and most preferably about 55 percent butenes (1 butene and/or 2-butene), and 20 to 40, more preferably 25 to 35 and most preferably about 25 to 30 percent by weight cyclohexane, optionally with benzene. A preferred cyclohexane/benzene mix was such that the ratio of cyclohexane to benzene was about 0.65.

Normally the polymerization is conducted at a temperature in the range of −35° to 100° C., more preferably from −10° C. to 50° C., most preferably 0° C. to 40° C. The polymerization can be conducted in a pressure autoclave if desired.

The polymerization can be advantageously carried out in the following manner: The butadiene feed, water and a mixture of the alkyl aluminum chloride compound with the trialkyl aluminum compound, can be added to the reaction vessel in any order, and can be mixed together in the reaction vessel or before addition to the reaction vessel. The cobalt catalyst can then be added, optionally predissolved in a suitable solvent or solvent mixture, and the polymerization carried out.

The following examples are presented to further illustrate the invention, however they are not intended to limit the scope of the invention to these particular embodiments.

EXAMPLES 1–7

The following polymerization reactions were carried out in a 5 liter stainless steel stirred reactor equipped with the necessary auxiliaries, like inlets and outlets for nitrogen, solvents, and catalysts, a cooling circuit and a premixing vessel. In each case the reactor was charged with 3 liters of a dry feed consisting of 20 percent by weight 1,3-butadiene, 55 percent by weight butenes (ratio of butene-2/butene-1 was about 0.3), and 25 percent by weight cyclohexane/benzene (ratio of cyclohexane to benzene was about 0.65). At 25° C., a previously prepared mixture of aluminumalkyl (10 percent by weigh aluminum alkyl in cyclohexane) with water was added to the feed so as to obtain a 0.00332 molar solution of Al in the reactor. The water to aluminum ratio was approximately 0.5. The polymerization was then initiated by injection of a cobalt solution (10% by weight cobalt salt in mineral oil) into the reactor so as to obtain a cobalt concentration of 1.9 ppm. When an amine was present it was added together with the cobalt solution, in the amounts listed in Table I. All materials were handled in a dry nitrogen atmosphere. The solvents and 1,3-butadiene were dried over alumina columns prior to use.

The conversion of the 1,3-butadiene to polybutadiene was monitored by GC analysis. At approximately 75% conversion, the polymerization was terminated by the addition of 2 ml ethanol to the reactor. The polymer solution was then washed with water and coagulated after addition of a standard hindered phenol antioxidant polymer stabilizer. The conversion times are reported in Table I.

The recovered product was then subjected to the following analytical tests. Molecular weight determinations (both Mw and Mn) were carried out with Gel Permeation Chromatography using a Waters GPC system being maintained at an internal temperature of about 30° C., and employing 5 "mixed bed" Styragel™ columns (HT6, HT5, HT4, HR3, HR1) in a series, a differential refractive index (DRI) detector and tetrahydrofuran as the eluent at a flow rate of 0.8 ml/min.

Viscosities of products at five percent by weight in styrene solvent (VS) were determined by conventional viscometric techniques. Mooney viscosities (VM) were determined according to ASTM 1646, ML 1+4 at 100° C. The ratio VS/VM was used as an indication of polymer linearity. These results are shown in Table II

TABLE I

| Example | R2A1C1 | Cobalt Salt | Amine | Amine Concentration (ppm on feed) | Conversion 25% (min) | Conversion 75% (min) |
|---|---|---|---|---|---|---|
| 1 | DEAC | Cobalt octoate | — | — | 7.5 | 32 |
| 2 | EOAC | Cobalt octoate | — | — | 10 | 47 |
| 3 | EOAC | Cobalt octoate | Triethanolamine | 0.8 | 8 | 40 |
| 4 | EOAC | Cobalt octoate | Triethylamine | 0.8 | 8 | 37 |
| 5 | EOAC | Cobalt neodecanoate | — | — | 7.5 | 37 |
| 6 | EOAC | Cobalt neodecanoate | Triethanolamine | 0.4 | 7 | 40 |
| 7 | EOAC | Cobalt neodecanoate | Triethanolamine | 0.8 | 6 | 41 |

TABLE II

| Example | $Mw^a$ | $Mn^a$ | Mw/Mn | VS (cPs) | VM | VS/VM |
|---|---|---|---|---|---|---|
| 1 | 374 | 107 | 3.5 | 90 | 48 | 1.88 |
| 2 | 395 | 133 | 3.0 | 119 | 51 | 2.33 |
| 3 | 399 | 117 | 3.4 | 130 | 51 | 2.55 |
| 4 | 369 | 106 | 3.5 | 113 | 49 | 2.31 |
| 5 | 364 | 98 | 3.7 | 96 | 45 | 2.13 |
| 6 | 353 | 92 | 3.8 | 87 | 42 | 2.07 |
| 7 | 337 | 99 | 3.4 | 73 | 38 | 1.92 |

As can be seen from the tables, comparative example 1 showed more branching (VS/VM closer to one) than the other examples. It can also be observed that the presence of the amine does seem to have an affect on the reaction rate.

It should be realized by those skilled in the art that the invention is not limited to the exact configuration or methods illustrated above, but that various changes and modifications may be made without departing from the spirit and scope of the invention as described within the following claims:

What is claimed is:

1. A catalyst system suitable for use in the production of high cis polybutadiene, comprising:
   cobalt neodecanoate;
   alkyl aluminum chloride selected from ethylaluminum sesquichloride and a compound of the structure $R_2AlCl$ where R is an alkyl group containing 2–8 carbon atoms;
   trialkyl aluminum compound of the formula $R_3Al$, where R is an alkyl group containing 2–8 carbon atoms; and
   water,
   wherein the cobalt neodecanoate is present in an amount such that the molar ratio of Co to Al is from 1:75 to 1:150.

2. The catalyst system of claim 1 wherein the alkyl aluminum chloride compound is ethylaluminum sesquichloride and the trialkyl aluminum compound is trioctylaluminum.

3. The catalyst system of claim 2 further comprising a ternary alkyl amine or a ternary aryl amine.

4. The catalyst system of claim 2 wherein the ethylaluminum sesquichloride and trioctyl aluminum are present in an amount such that the concentration of Al is in the range of from 0.002 to 0.004 moles per liter.

5. The catalyst system of claim 1 wherein the water is present in an amount of 0.1 to 0.8 moles per mole of the alkyl aluminum chloride compound.

6. The catalyst system of claim 3 wherein the ternary alkyl amine or ternary aryl amine is triethanolamine or triethylamine.

7. The catalyst system of claim 3 wherein the ternary alkyl amine or ternary aryl amine present in an amount such that the molar ratio of Co to N in the system is in the range of from 1:1 to 1:3.

8. A catalyst system suitable for use in the production of high cis polybutadiene, comprising the product of mixture of:
   a) cobalt neodecanoate;
   b) ethylaluminum sesquichloride;
   c) trioctyl aluminum; and
   d) water,
   wherein ethylaluminum sesquichloride and trioctyl aluminum are added in such an amount that the concentration of Al is in the range of from 0.002 to 0.004 moles per liter, and the cobalt neodecanoate is present in an amount such that the molar ratio of Co to Al is in the range of 1:75 to 1:150.

9. The catalyst system of claim 8 further comprising a ternary alkyl amine in an amount such that the molar ratio of Co to N in the system is in the range of from 1:1 to 1:3.

10. A process for producing polybutadiene having a high cis content comprising contacting a feed comprising 1,3-butadiene, butene and cyclohexane with a catalyst system to polymerize the 1,3-butadiene, wherein the catalyst system comprises:
    a) a cobalt neodecanoate;
    b) alkyl aluminum chloride selected from ethylaluminum sesquichloride and a compound of the structure $R_2AlCl$ where R is an alkyl group containing 2–8 carbon atoms;
    c) trialkyl aluminum compound of the formula $R_3Al$, where R is an alkyl group containing 2–8 carbon atoms; and
    d) water,
    wherein the cobalt neodecanoate is present in an amount such that the ratio of Co to Al is from 1:75 to 1:150.

11. The process of claim 10 wherein the feed additionally contains benzene.

12. The process of claim 11 wherein the feed comprises 20 percent by weight 1,3-butadiene and 55 percent by weight butene.

13. The process of claim 12 wherein the catalyst system further comprises a ternary alkyl amine or a ternary aryl amine.

14. The process of claim 13 wherein the alkyl aluminum chloride compound is ethylaluminum sesquichloride; the trialkyl aluminum compound is trioctyl aluminum; and wherein ethylaluminum sesquichloride and trioctyl aluminum are added in such an amount that the concentration of Al is in the range of from 0.002 to 0.004 moles per liter, and wherein the ternary alkyl amine or ternary aryl amine is triethanolamine or triethylamine added in such amount so that the molar ratio of Cobalt to nitrogen is the range of 1:1 to 1:3.

15. The catalyst system of claim 2 wherein the ethylaluminum sesquichloride and trioctyl aluminum are reacted together prior to combining with the other elements.

* * * * *